(12) United States Patent
Madani et al.

(10) Patent No.: US 11,392,746 B2
(45) Date of Patent: Jul. 19, 2022

(54) METHOD FOR THE NON-COPYABLE MANUFACTURE OF INTEGRATED CIRCUITS

(71) Applicant: University of Louisiana at Lafayette, Lafayette, LA (US)

(72) Inventors: Siroos Madani, Lafayette, LA (US); Mohammad R. Madani, Lafayette, LA (US); Magdy Bayoumi, Lafayette, LA (US)

(73) Assignee: University of Louisiana Lafayette, Lafayette, LA (US)

( * ) Notice: Subject to any disclaimer, the term of this patent is extended or adjusted under 35 U.S.C. 154(b) by 0 days.

(21) Appl. No.: 17/194,397

(22) Filed: Mar. 8, 2021

(65) Prior Publication Data

US 2021/0192119 A1    Jun. 24, 2021

Related U.S. Application Data

(63) Continuation of application No. 16/853,976, filed on Apr. 21, 2020, now Pat. No. 10,970,453, which is a continuation of application No. 16/269,658, filed on Feb. 7, 2019, now Pat. No. 10,664,643.

(60) Provisional application No. 62/628,543, filed on Feb. 9, 2018.

(51) Int. Cl.
| | |
|---|---|
| *G06F 30/394* | (2020.01) |
| *H01L 23/00* | (2006.01) |
| *G06F 30/392* | (2020.01) |
| *G06F 21/75* | (2013.01) |

(Continued)

(52) U.S. Cl.
CPC ............ *G06F 30/394* (2020.01); *G06F 21/75* (2013.01); *G06F 30/392* (2020.01); *H01L 23/57* (2013.01); *H01L 23/573* (2013.01); *H01L 25/0657* (2013.01); *G06F 30/39* (2020.01);
(Continued)

(58) Field of Classification Search
CPC ...... G06F 30/394; G06F 30/392; G06F 21/75; G06F 30/39; H01L 23/573; H01L 23/57; H01L 2225/06541; H01L 25/0657; H01L 2225/06527
See application file for complete search history.

(56) References Cited

U.S. PATENT DOCUMENTS

| | | | | |
|---|---|---|---|---|
| 5,452,229 | A | * | 9/1995 | Shankar ......... H03K 19/018521 326/45 |
| 5,544,070 | A | * | 8/1996 | Cox ....................... G11C 17/16 257/E23.147 |

(Continued)

FOREIGN PATENT DOCUMENTS

WO    WO-2017218829 A1  * 12/2017 ............. G06F 21/75

*Primary Examiner* — Stacy Whitmore
(74) *Attorney, Agent, or Firm* — Kean Miller, LLP; Russel O. Primeaux; Jessica C. Engler

(57) ABSTRACT

The method for creating integrated circuits (IC) protects the design of a manufactured IC from being copied or counterfeited. This method protects the design of an IC chip from deliberate copying and counterfeiting by reverse engineering to gain access to the critical points in the IC chip and to siphon its functions and design. The method makes the copying, counterfeiting, and controlling by addition of Trojan circuits during manufacturing almost impossible task. It also allows chip designers to outsource the final bonding of the tiers without any fears that their design may get compromised.

16 Claims, 19 Drawing Sheets

(51) Int. Cl.
    *H01L 25/065*     (2006.01)
    *G06F 30/39*     (2020.01)

(52) U.S. Cl.
    CPC .............. *H01L 2225/06527* (2013.01); *H01L 2225/06541* (2013.01)

(56) References Cited

U.S. PATENT DOCUMENTS

| | | | | |
|---|---|---|---|---|
| 6,100,746 A * | 8/2000 | Wu | ................ | H01L 23/5256 257/E23.149 |
| 6,983,428 B2 * | 1/2006 | Cernea | ................ | G11C 7/06 365/185.23 |
| 7,746,696 B1 * | 6/2010 | Paak | ................ | G11C 16/0441 365/185.08 |
| 8,381,161 B1 * | 2/2013 | Andersen | ................ | G06F 30/392 716/119 |
| RE45,110 E * | 9/2014 | Madurawe | ................ | G06F 30/30 716/138 |
| 9,106,229 B1 * | 8/2015 | Hutton | ................ | H01L 25/105 |
| 9,412,645 B1 * | 8/2016 | Or-Bach | ................ | H03K 19/17736 |
| 9,570,161 B2 * | 2/2017 | Liu | ................ | G11C 16/0416 |
| 9,570,175 B2 * | 2/2017 | Liu | ................ | G11C 11/5635 |
| 10,664,643 B2 * | 5/2020 | Madani | ................ | H01L 25/0657 |
| 10,970,453 B2 * | 4/2021 | Madani | ................ | G06F 30/392 |
| 11,128,437 B1 * | 9/2021 | Nossik | ................ | H04L 67/146 |
| 11,128,500 B1 * | 9/2021 | Mentovich | ................ | H04L 25/4975 |
| 2011/0154032 A1 * | 6/2011 | Mauro, II | ................ | G06F 21/79 713/165 |
| 2011/0227603 A1 * | 9/2011 | Leon | ................ | H01L 23/576 326/8 |
| 2012/0286822 A1 * | 11/2012 | Madurawe | ................ | G06F 30/39 326/41 |
| 2016/0211241 A1 * | 7/2016 | Law | ................ | H03K 17/56 |
| 2016/0307623 A1 * | 10/2016 | Liu | ................ | G11C 11/5635 |
| 2016/0307637 A1 * | 10/2016 | Hsu | ................ | G11C 16/3427 |
| 2018/0011959 A1 * | 1/2018 | Irissou | ................ | G06F 30/3323 |
| 2019/0057177 A1 * | 2/2019 | Trujillo | ................ | G06F 30/394 |

\* cited by examiner

Obfuscated part

US 11,392,746 B2

METHOD FOR THE NON-COPYABLE MANUFACTURE OF INTEGRATED CIRCUITS

CROSS REFERENCE TO RELATED APPLICATION

This application is a continuation of U.S. patent application Ser. No. 16/853,976, titled "Method for the Non-Copyable Manufacture of Integrated Circuits", filed on Apr. 21, 2020, which is a continuation of U.S. patent application Ser. No. 16/269,658, titled "Method for the Non-Copyable Manufacture of Integrated Circuits", filed on Feb. 7, 2019, which claims priority to the U.S. Provisional Application No. 62/628,543, titled "Method for the Non-Copyable Manufacture of Integrated Circuits", filed on Feb. 9, 2018.

STATEMENT REGARDING FEDERALLY SPONSORED RESEARCH OR DEVELOPMENT

Not applicable.

REFERENCE TO A "SEQUENCE LISTING", A TABLE, OR COMPUTER PROGRAM

Not applicable.

DESCRIPTION OF THE DRAWINGS

The drawings constitute a part of this specification and include exemplary examples of the METHOD FOR THE NON-COPYABLE MANUFACTURE OF INTEGRATED CIRCUITS, which may take the form of multiple embodiments. It is to be understood that in some instances, various aspects of the invention may be shown exaggerated or enlarged to facilitate an understanding of the invention. Therefore, drawings may not be to scale.

FIELD OF THE INVENTION

Figure 1:
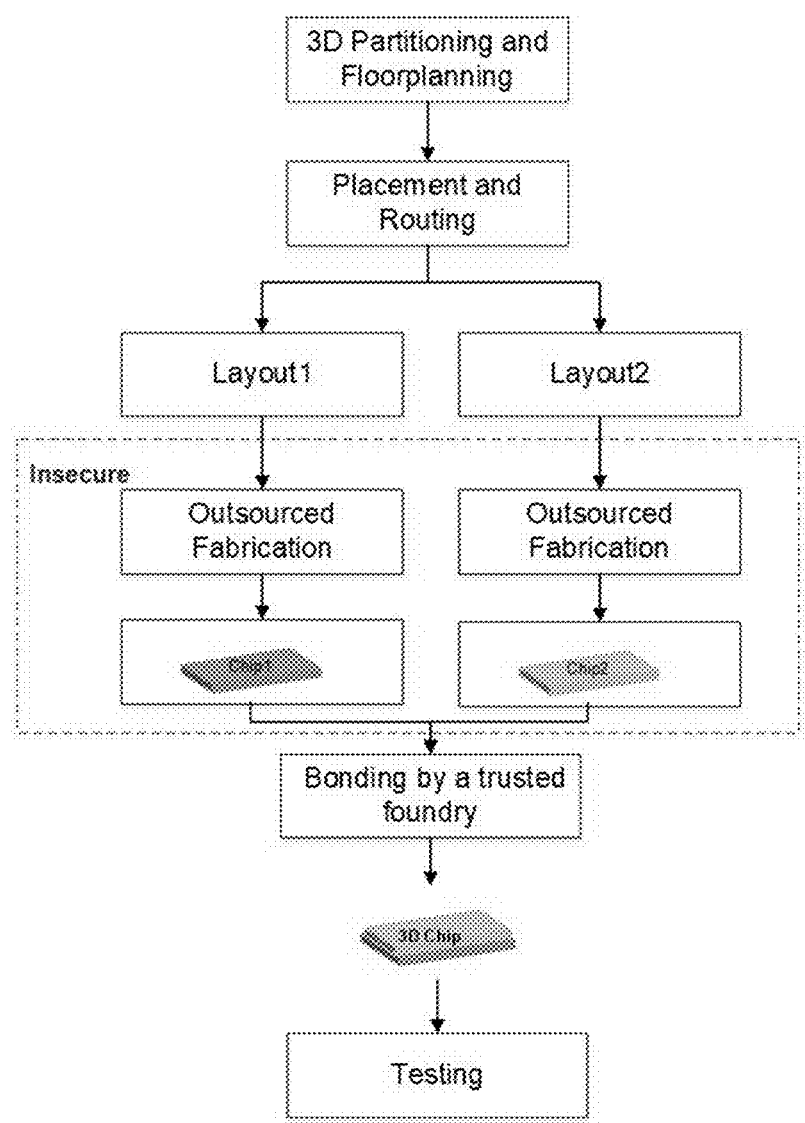
FIG. 1 depicts a flow chart of the traditional process of three-dimensional (3D) integrated circuit design.

The disclosed invention relates generally to the field of manufacture of integrated circuits. More specifically, this invention relates to the field of protective manufacture of integrated circuits to enhance security and prevent counterfeiting.

BACKGROUND OF THE INVENTION

Outsourcing chips for fabrication is an effective way to save money and to reduce the time from design to market. However, it raises numerous security challenges for chip designers, as some of the foundries try to identify the functionality of the chip to take its ownership. Furthermore, a Trojan circuit can be implanted deliberately by some of the foundries to control or divert the chip's function by a predetermined set of states or to steal important information about the design such as encryption key. S. Skorobogatov and C. Woods, "Breakthrough silicon scanning discovers backdoor in military chip," in PROC. 14TH INT. WORKSHOP CRYPTOGRAPHIC HARDWARE. EMBEDDED SYST., 2012, pp. 23-40; K. Vaidyanathan, B. P. Das, and L. Pileggi, "Detecting reliability attacks during split fabrication using test-only BEOL stack," in PROC. 51ST ACM/EDAC/IEEE DES. AUTOM. CONF., 2014, pp. 1-6.

The Semiconductor Industry Association (SIA) estimates that counterfeit parts cost U.S. semiconductor companies more than $7.5 billion per year in lost revenue. While the financial losses are significant, the greater threat is the use of counterfeit electronics parts in commercial transportation and military systems. Nicole Faubert, "Counterfeit threats for electronic parts", EDN NETWORK (Dec. 30, 2013).

Due to physical limitations in transistor scaling, Moore's law (number of transistors must be doubled every 18 months) has become obsolete. One solution to revive this law is utilizing the 3D integrated circuit (3D IC) instead of 2D. 3D ICs have multiple layers which are stacked on top of each other. These layers are connected by vertical interconnects called Through Silicon Vias (TSVs).

3D-IC can be an effective solution to the challenges that threaten the security of the chip by splitting the manufacturing process of the chip among different foundries. Y. Xie, J. Cong, and S. S. Sapatnekar, "Three-Dimensional Integrated Circuit Design", New York, N.Y., USA: Springer, 2010. In 3D IC manufacturing the entire design of the chip is distributed among different tiers in the 3D stack. Imeson, Frank, et al. "Securing Computer Hardware Using 3D Integrated Circuit (IC) Technology and Split Manufacturing for Obfuscation", *USENIX Security Symposium*, 2013. Tiers containing critical logic blocks are sent to a trusted local foundry to be fabricated while the less critical tiers are sent to the less reliable foundries to meet their limited financial budget. The final bonding of tiers also carries out by a most trusted foundry because here is always a possibility that the final foundry to extract the gate level netlist of the design by utilizing some of the reverse engineering techniques since they have access to the entire tiers. Xie, Yang, et al. "Security and vulnerability implications of 3D ICs", *IEEE Transactions on Multi-Scale Computing Systems* 2.2 (2016), pp. 108-122.

Today, chip reverse engineering uses imaging equipment to analyze and to recreate the chip. W. Li et al., "Reverse engineering circuits using behavioral pattern mining", HARDWARE-ORIENTED SECUR. TRUST (HOST), 2012. The images can be obtained by a combination of de-layering and imaging of the chip followed by pattern recognition and pattern matching to extract the schematic of the chip. R. Torrance et al., "The State-of-the-Art in IC Reverse Engineering", PROC. 11TH INT. WORK. CRYPTOGR. HARDW. EMBED. SYST., 2009. With all the current techniques that are used to safeguard the design of an IC chip once the manufactured chip is in the possession of an adversary the hardware design can be obtained by the reverse engineering the chip. Therefore, currently there is no high assuring way to prevent the total reverse engineering of the chip. However, if a combination of software and hardware skims is used to secure the chip, the design extraction of the chip will be nearly impossible even if the chip were subjected to the most intense reverse engineering techniques. Consequently, there is a need in the market for a more secure method for performing this chip integration.

SUMMARY OF THE INVENTION

The disclosed invention provides a method for creating integrated circuits (IC) protects the design of a manufactured IC from being copied or counterfeited, allowing chip designers to outsource the final bonding of the tiers without any fears that their design may get compromised.

The disclosed method is comprised of four key steps. First, the critical interconnects to be protected are identified, which include interconnects with low controllability and observability and low transition interconnects. Second, an additional layer (the "security layer") is added between two neighboring layers of the chip. The security layer comprises programmable logic array or wires without any logic blocks, which obfuscate the wires or interconnects of the 3D chip and obfuscate the critical logic blocks. Third, the stack is sent back to the design foundry and test group to configure the final product; once configured and tested, the functionality of the chip cannot be extracted by reverse engineering. The configuration steps comprise a novel method for erasing, programming the obfuscations, and optional obfuscation path elimination.

DETAILED DESCRIPTION OF THE INVENTION

In traditional 3D IC design flow shown in FIG. 1, factors such as area, power density, partioning, and congestion are the most significant parameters that are considered. As the security of the chip factors is gaining importance, this factor needs to be taken into consideration during the early stages of design flow to protect the chip against any types of attack.

The detection of Trojan circuits is added to the new designs to detect and prevent Trojan circuits to be effective. However the circuitry of this technique is exposed by the fabrication foundries. So, the detection circuitry can be avoided by the foundries who manufacture the chip.

Figure 2:
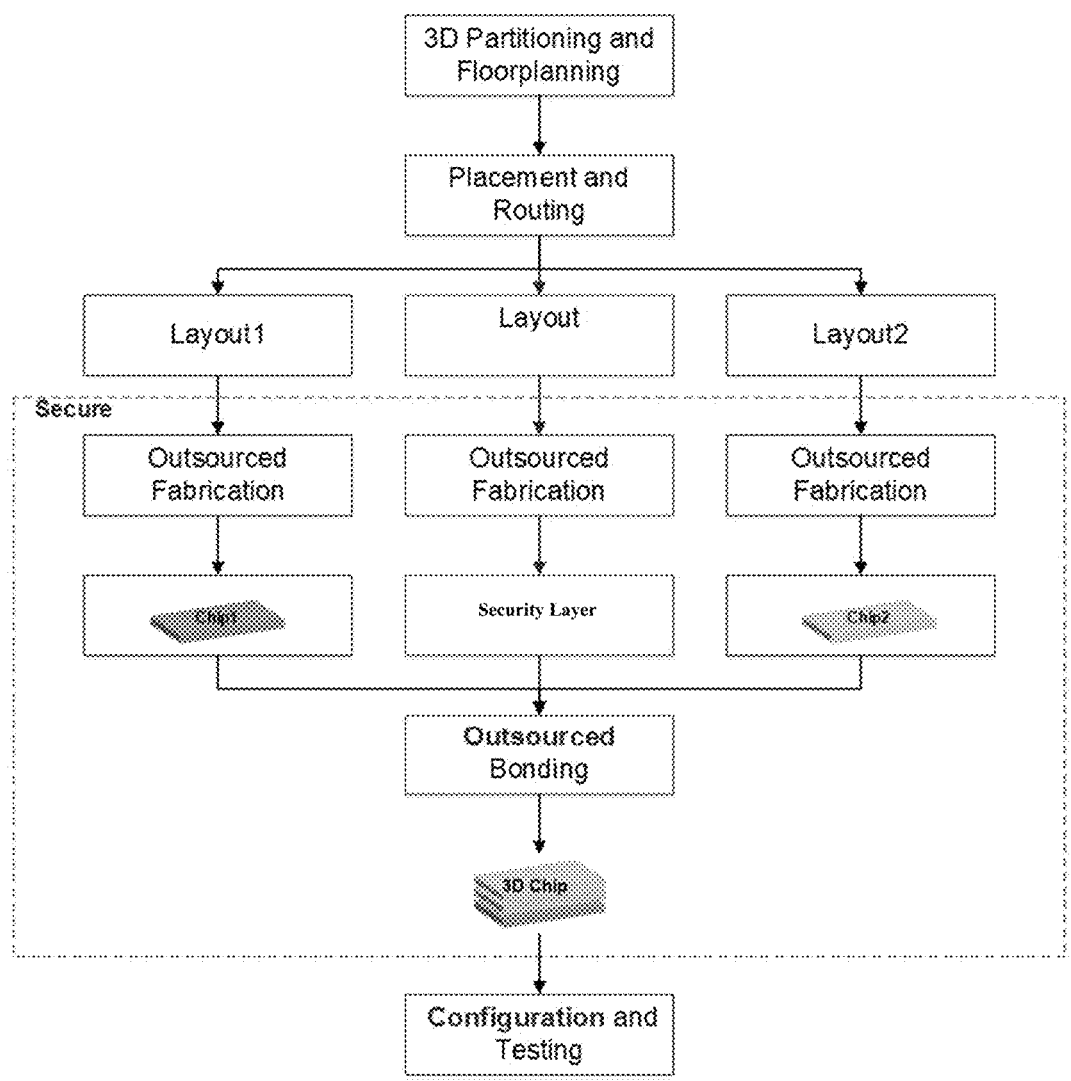
FIG. 2 depicts the proposed physical design flow of the METHOD FOR THE NON-COPYABLE MANUFACTURE OF INTEGRATED CIRCUITS.
Figure 3:
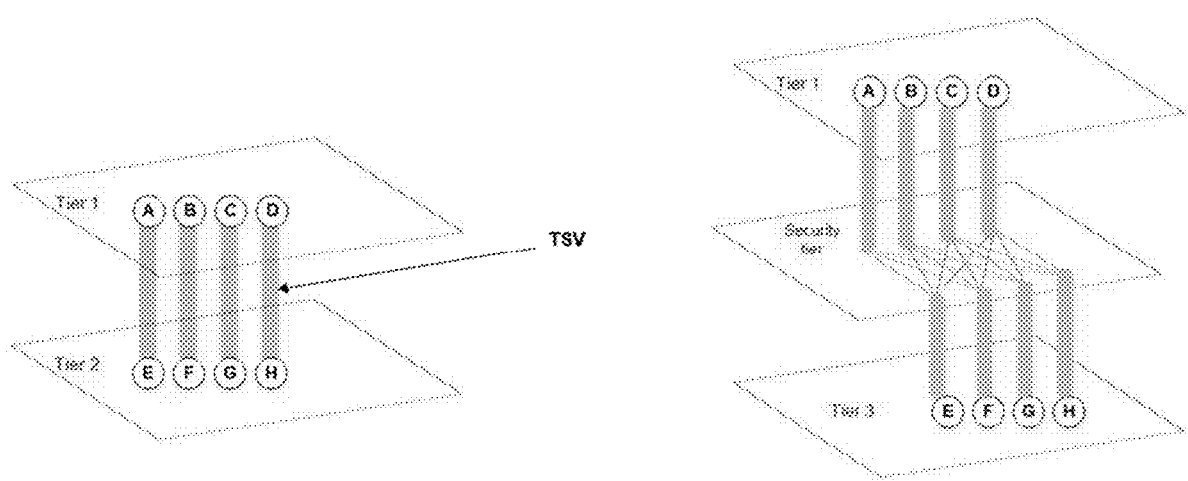
FIG. 3 shows an image comparison of a non-secure 3D integrated circuit and a secure 3D integrated circuit that has been formed using the METHOD FOR THE NON-COPYABLE MANUFACTURE OF INTEGRATED CIRCUITS.
Figure 4:
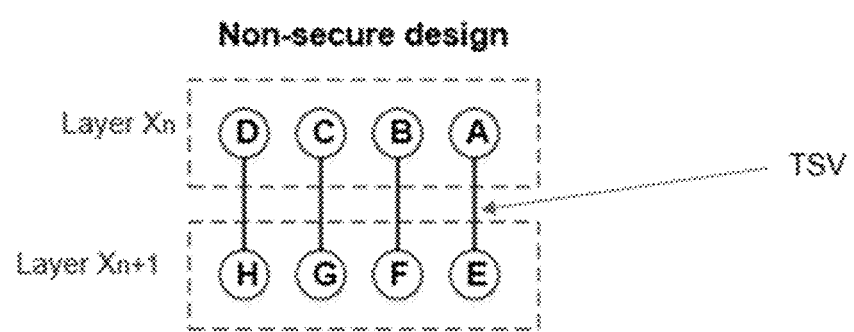
FIG. 4 shows a 3D integrated circuit with a non-secure design.
Figure 5:
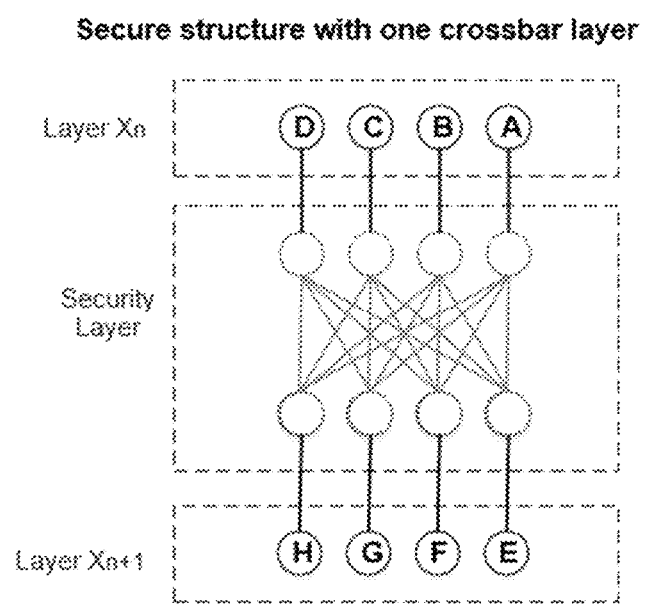
FIG. 5 shows a 3D integrated circuit with a secure structure using one cross-bar layer.
Figure 6:
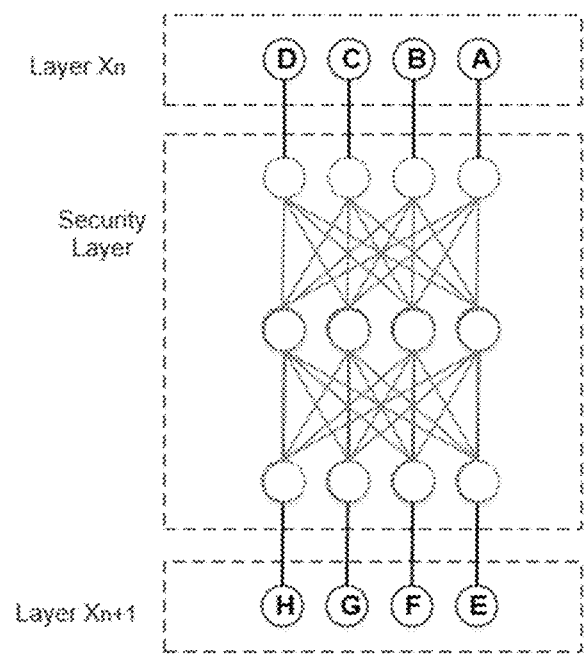
FIG. 6 shows a 3D integrated circuit with a secure structure using two cross-bar layers.
Figure 7:
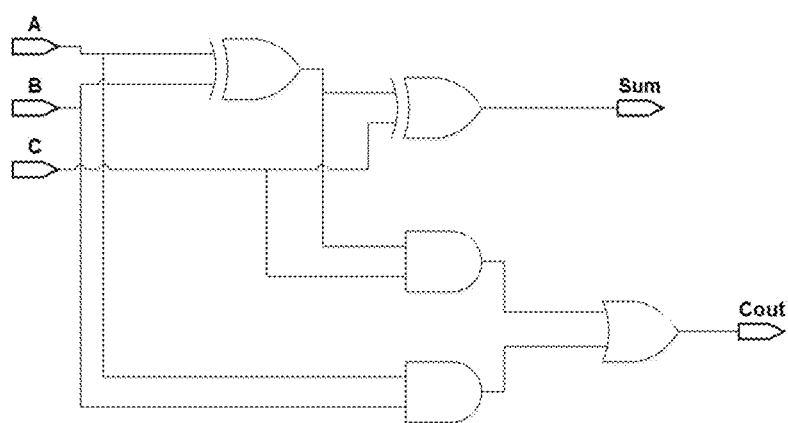
FIG. 7 shows the 2D design of a one-bit full adder logic block that will be implemented in the security layer by using the programmable logic array (PLA).
Figure 8:
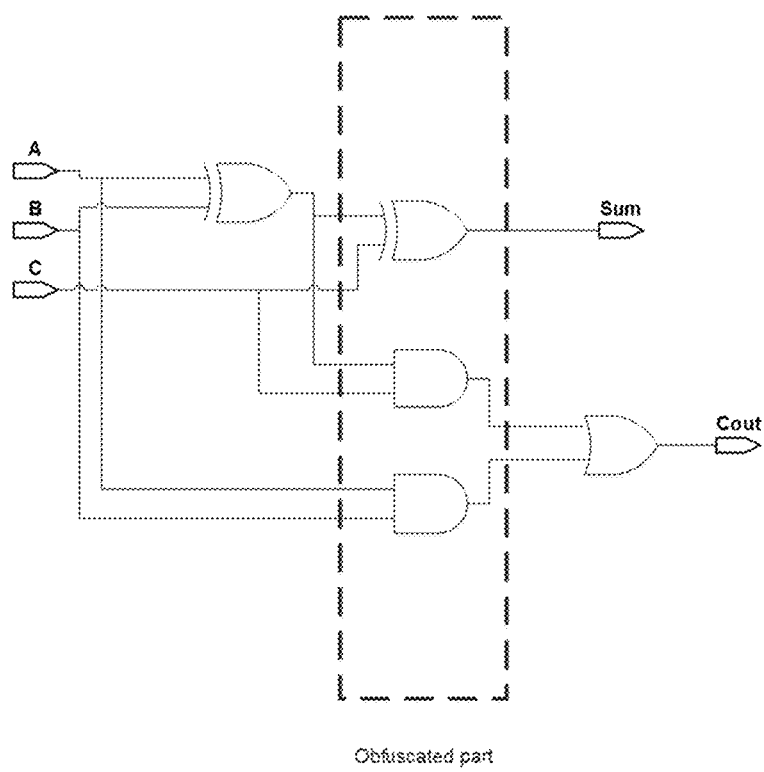
FIG. 8 shows the preparation of the 2D one-bit full adder logic block, wherein the critical logic gates are identified.
Figure 9:
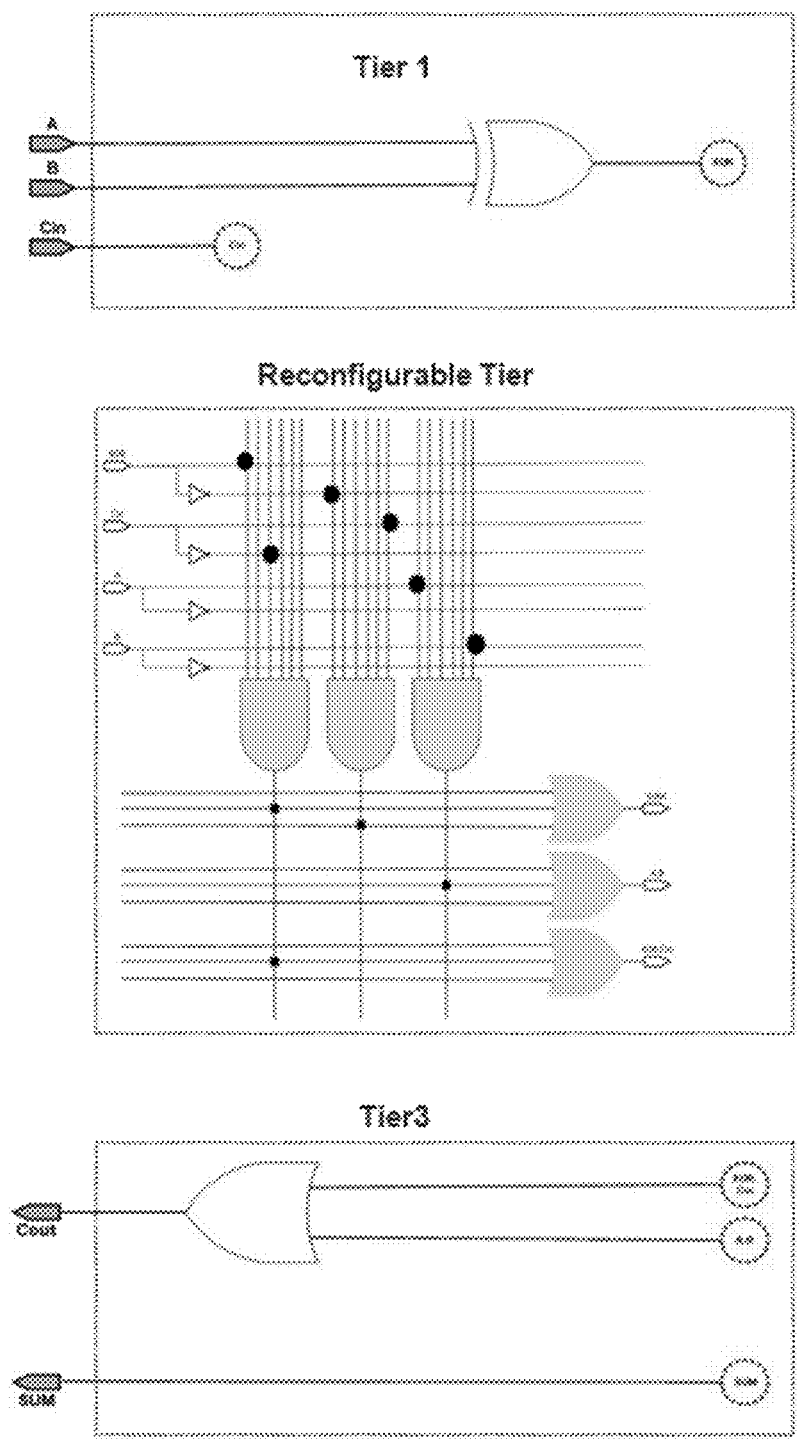
FIG. 9 shows the three tiers of the 2D one-bit full adder logic block.
Figure 10:
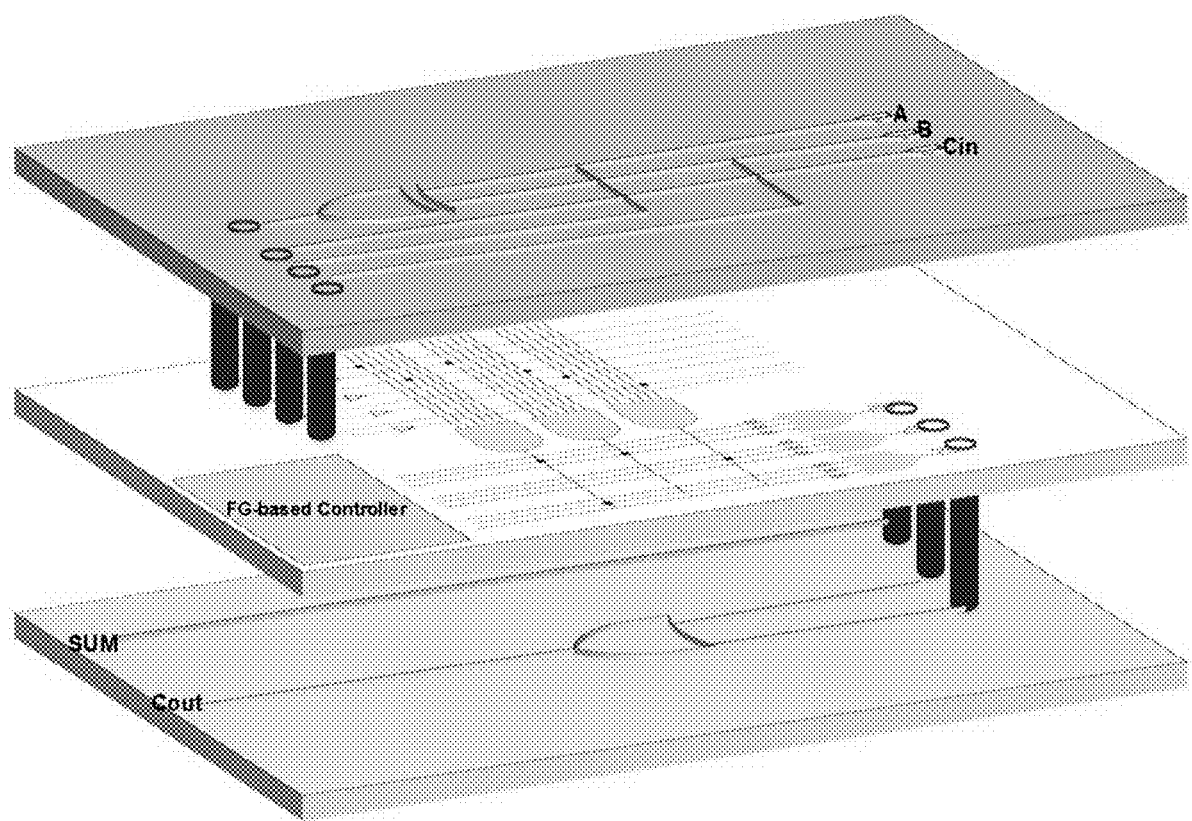
FIG. 10 shows a constructed, secure one-bit full adder as a 3D integrated circuit stack.

In the disclosed flow method shown in FIG. 2, 3D IC flow is used alongside NVM to strengthen the security of the chip against reverse engineering attacks. This method adds an extra security layer which contains the critical logic blocks and hides the connectivity among important logic blocks. By doing so, even the final bonding of the 3D stack can be outsourced as well.

In the disclosed method, another security factor is taken into consideration. After the synthesis, critical logical blocks or nets to be protected are identified. A list containing critical logic blocks and nets are sent to the 3D partitioning and floorplanning step. The critical logical blocks are finally placed and routed in different layouts so one outsource foundry will not have access to an entire critical block.

Identifying critical block and interconnects: Critical interconnects that need to be protected include: (1) interconnects with low controllability and observability; and (2) low transition interconnects. These two types of interconnects are most likely to be used by attackers to activate implanted Trojan circuits. Each chip has sensitive circuitry such as cache memory, encryption circuit that is mostly targeted by attackers. In order to hide the functionality of the essential circuit, part of their logic blocks (the "critical logic blocks") are selected to be obfuscated.

Applying the Security Layer: To increase the security of the 3D chip, an extra layer is added between two neighboring layers (the security layer). The security layer comprises of a programmable logic array (PLA) or wires without any logic blocks (skein wires). Skein wires refer to additional crossbar switches which are added to the circuitry to increase the complexity of the connection among components that are located on different tiers in the 3D stack. Crossbar layers can be one, or multilayers depend on the level of complexity that we need to apply. The objective of adding security layers is to: (1) obfuscate the wires or interconnects in the 3D chip; and (2) obfuscate the critical logic blocks.

To obfuscate a 2D interconnect, as shown in FIGS. 3, 4, 5, and 6, two steps are required: (1) the 2D net is replaced by a TSV; and (2) adding crossbar switches in the security layer to increase the complexity of point to point connections.

FIGS. 7, 8, 9, and 10 provide an example obfuscation of the functionality of a single bit adder. The selected logic blocks are implemented in the security layer by using programmable logic array (PLA).

Post-bonding configuration: Once configured, the manual 3D stack is sent back to the design foundry and test group to configure the final product. Once the chip is configured and tested, no adversary will be able to extract the functionality of the chip by reverse engineering. The post-bonding configuration contains three steps: (1) Erasing; (1) Programming of obfuscations; and (3) optional obfuscation path elimination.

Configuration: An array of floating gate cells or Non-volatile memory (NVM) are added in the security layer for configuring the security layer. NVM is an emerging technology that has faster read/write operation, less power consumption. It also can be used for hardware security purposes as well. One of the most significant features of NVM memory cell is that it can retain the data for a long duration of time ($\approx$10 years) when it is unpowered. The other significant feature of NVM is that the state of off/on (presence of electrons/absence of electrons in the gate oxide) of a floating gate transistor in not detectable by most sophisticated reverse engineering methods.

In the security layer, NVM cells are used to store the configuration of the 3D IC regarding the connectivity among logic blocks which are located on different layers (tiers). Furthermore, the configuration of the crossbar is stored in an array of NVM cells. This layer immune the 3D IC against attacks during/post manufacturing.

Figure 11:
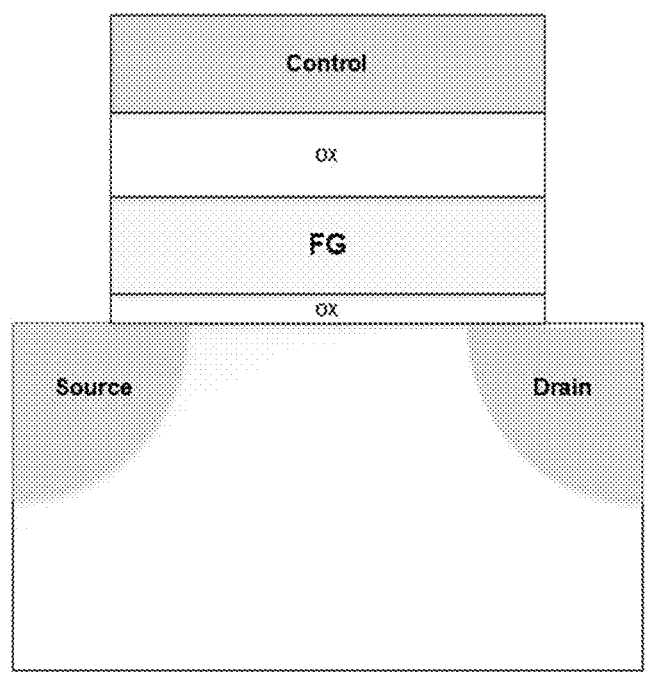
FIG. 11 shows a diagram of a floating gate MOSFET (FGMOS).
Figure 12:
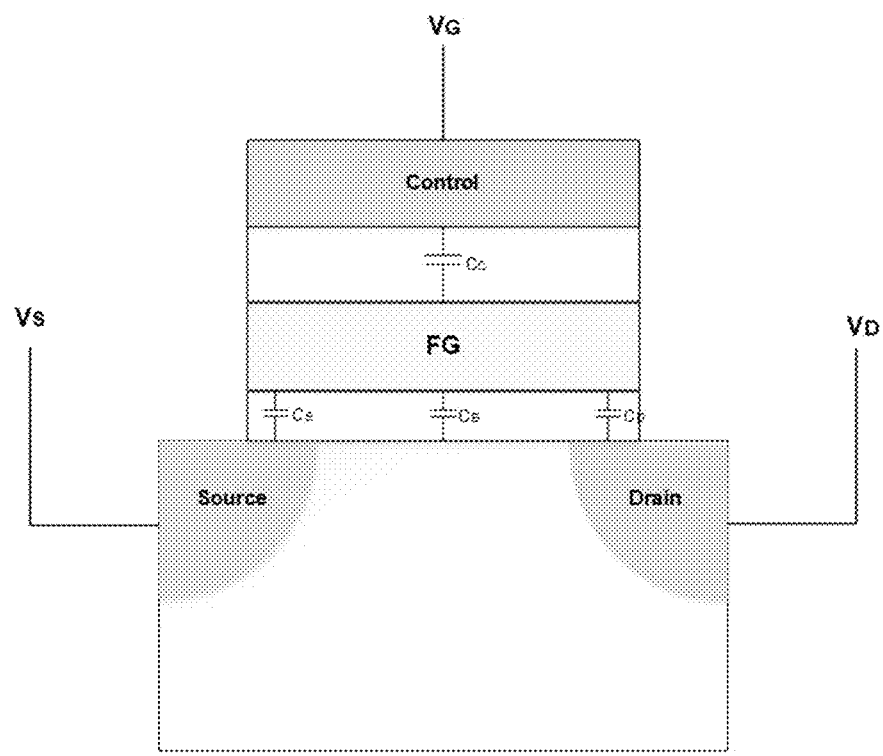
FIG. 12 shows a diagram of the voltages being applied to the FGMOS.

The floating gate MOSFET (FGMOS) is an MOS transistor capable of storing electrical charge. The gate of the FGMOS is electrically isolated, creating a floating node. Since the FG is surrounded by highly resistive oxide material, the trapped charge in the FG remains unchanged for years. When there is no charge in the floating gate, it acts as a traditional CMOS. As seen in FIGS. 11 and 12, the floating gate is surrounded by oxide layers and there is no direct access to the floating gate area. The floating gate can be controlled by hot carrier injections and Fowler-Nordheim Tunneling.

Figure 13:
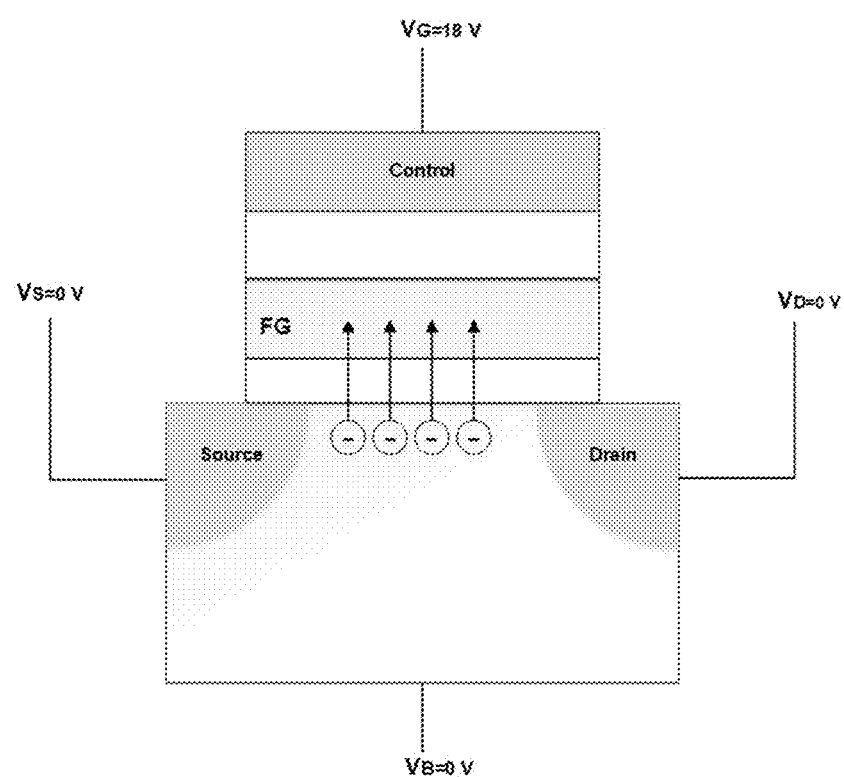
FIG. 13 shows the process of using hot electron injection to program or inject electrons into the floating gate.

Hot electron injection is used to program or inject electron into the floating gate. During the programming mode, $V_D$ and $V_S$ and $V_B$ are connected to the ground while 18V is applied to the gate. Once the hot electrons are injected into the floating gate the threshold of the transistor will increase, the transistor will be off for the normal gate operation voltage and the connection of TSVs (link) will be discontented. This process is seen in FIG. 13.

Figure 14:
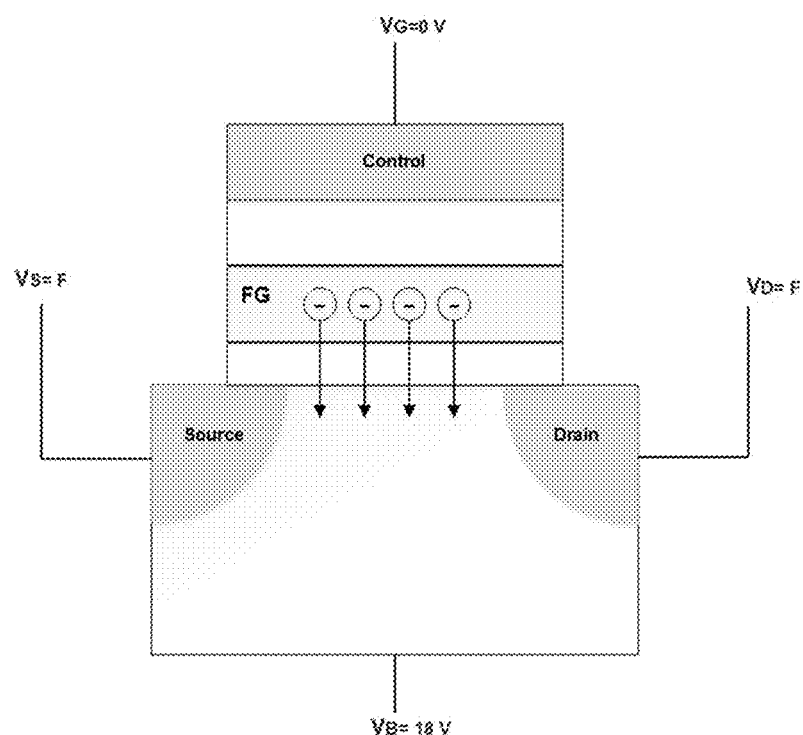
FIG. 14 shows the process of using Fowler-Nordheim Tunneling to remove electrons from the floating gate in the circuit.

Fowler-Nordheim Tunneling is used to remove electrons from the floating gate in a circuit. During the erase mode, $V_G$ is connected to the ground while $V_S$ and $V_D$ are floated (F) and 18 V is applied to $V_B$. This process is seen in FIG. 14.

Figure 15:
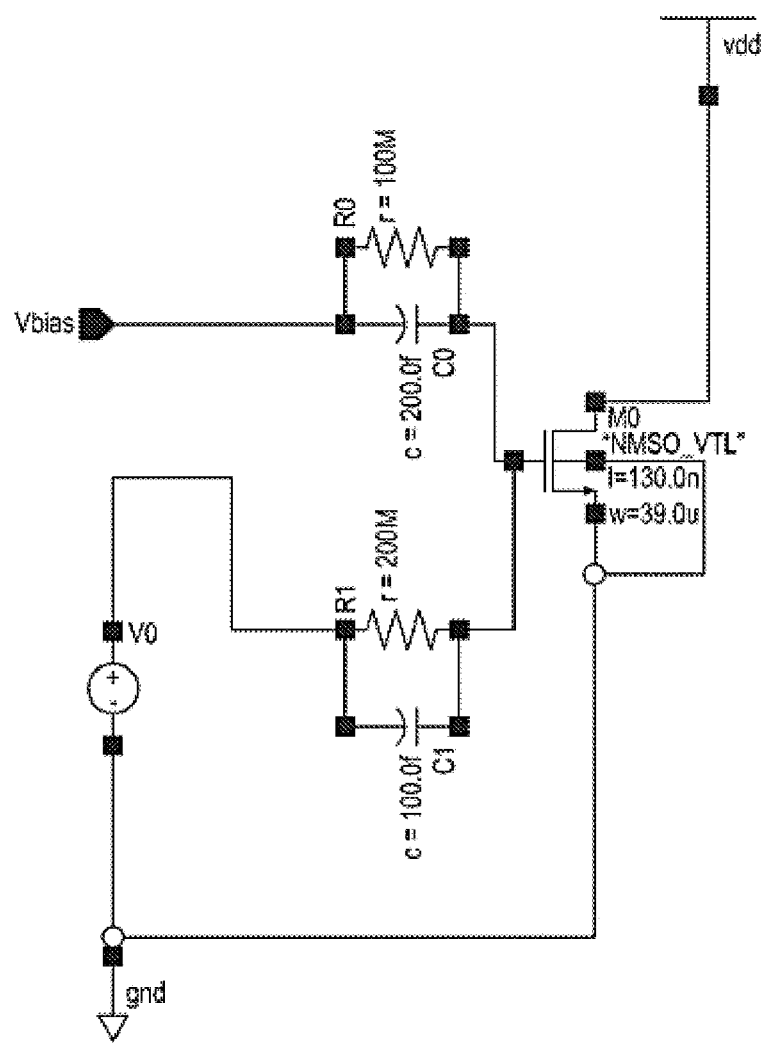
FIG. 15 shows the FGMOS spice model. The charge in the FGMOS is controlled by $V_{bias}$.
Figure 16:
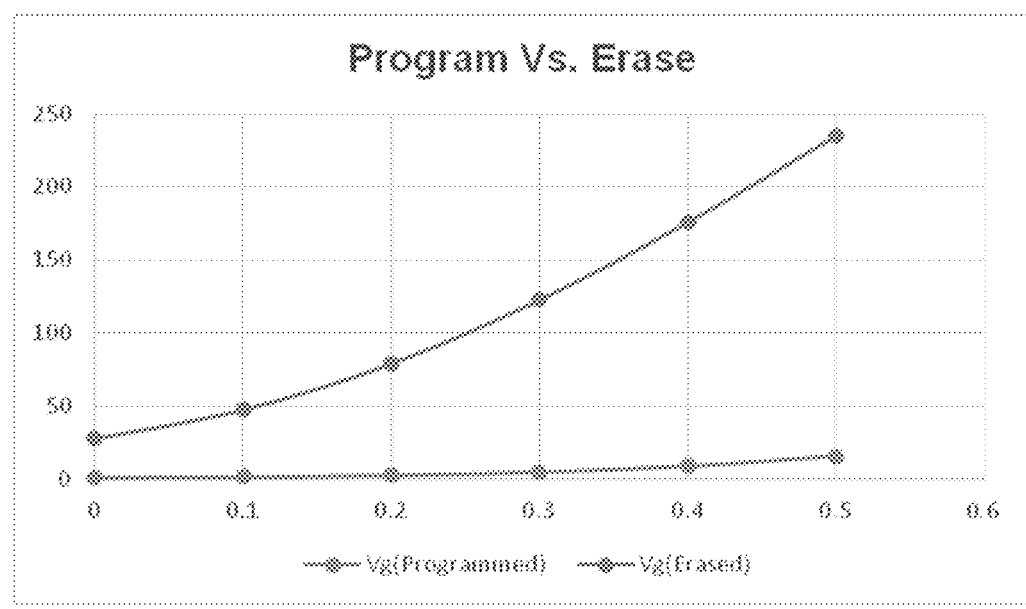
FIG. 16 provides a diagram of the voltage during programming and erasing processes.

The FGMOS spice model is shown in FIG. 15. The amount of charge in the floating gate is controlled by $V_{bias}$. Adding electrons to the floating gate increases the threshold voltage of transistor. The threshold voltage of the transistor shifts to a higher value if there is charge trapped in the floating gate. Trapped electrons hinder the movement of electrons between source and drain, therefore, Id will be zero.

Path Elimination of Configuration Obfuscation: After configuring the security layer, the configuration must be protected so that attackers are not able to reconfigure the chip in the future. Furthermore, an attacker must be barred from reading the current configuration of the security layer. To do so, extra circuitry is added to destroy the programmability of the Floating gate as soon as the floating gate transistors are programmed.

Figure 17:
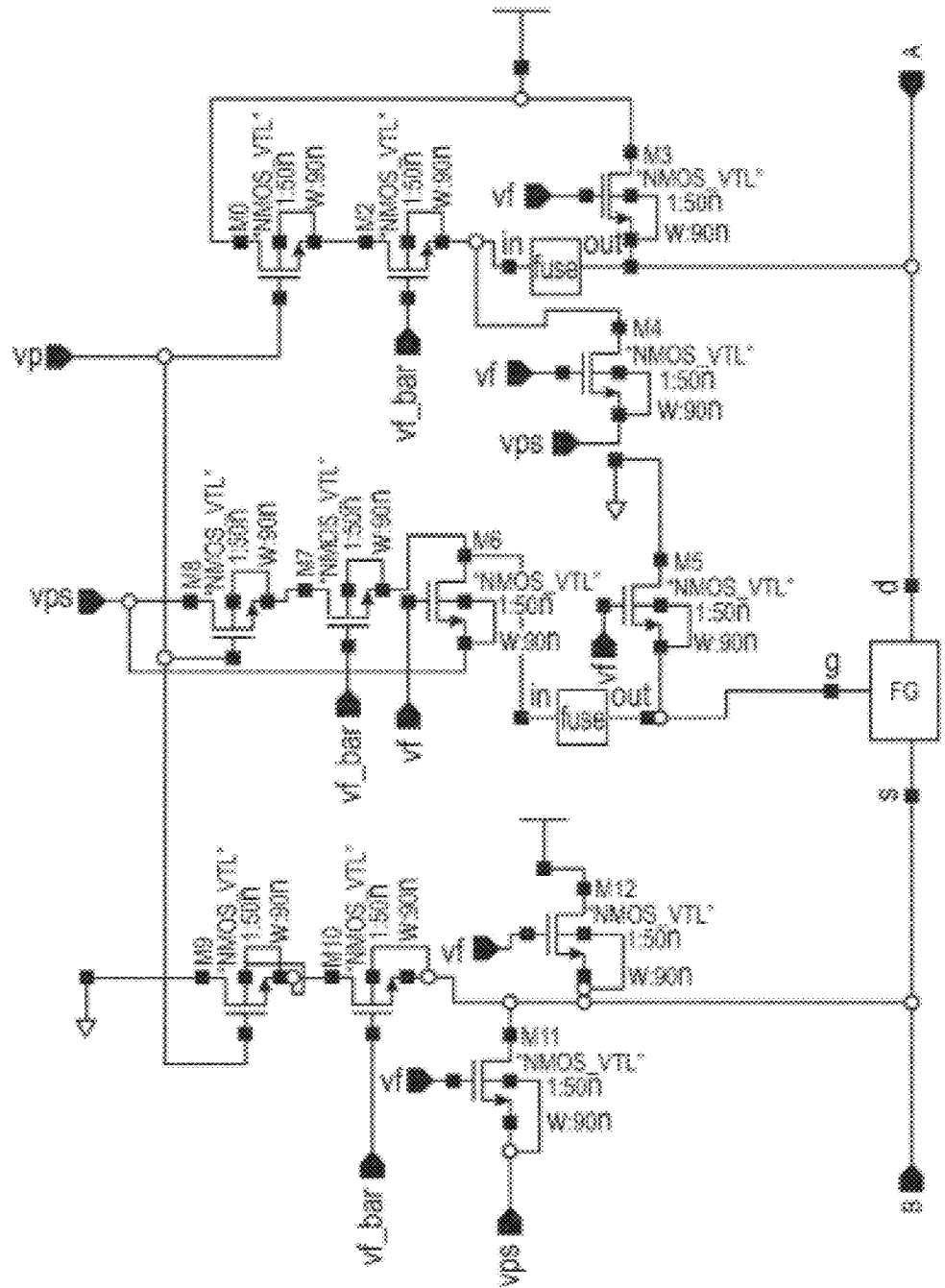
FIG. 17 provides a diagram of the proposed circuitry for programming and destroying the programmability of the floating gate.

The circuitry for programming and destroying the floating gate programmability is shown in FIG. 17. After programming, the fuses in the circuit are destroyed. Consequently, the floating gate cannot be accessed, reprogrammed, or read.

Figure 18:
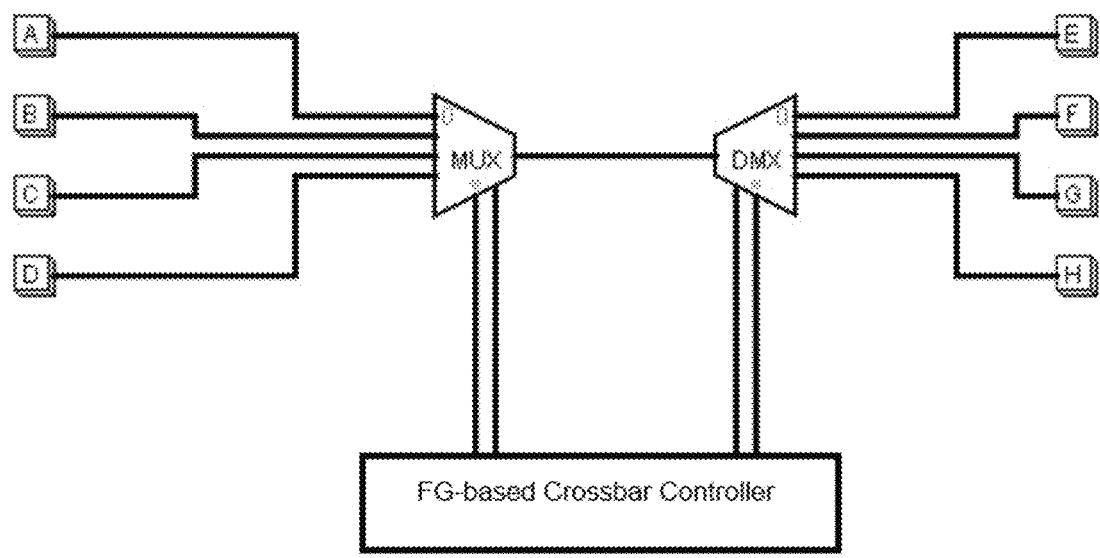
FIG. 18 provides a drawing of a crossbar controller.

A crossbar switch, shown in FIG. 18, is implemented by using a multiplexer and a demultiplexer for a single layer crossbar. The crossbar controller decides on the destination pin for each input node of the multiplexer. The crossbar switch is placed in the security layer. It is used to protect critical nets, so it makes it difficult for an attacker to reverse engineer the chip to detect the connectivity among logic block. The crossbar switches are used to safeguard TSVs in the 3D IC.

Figure 19:
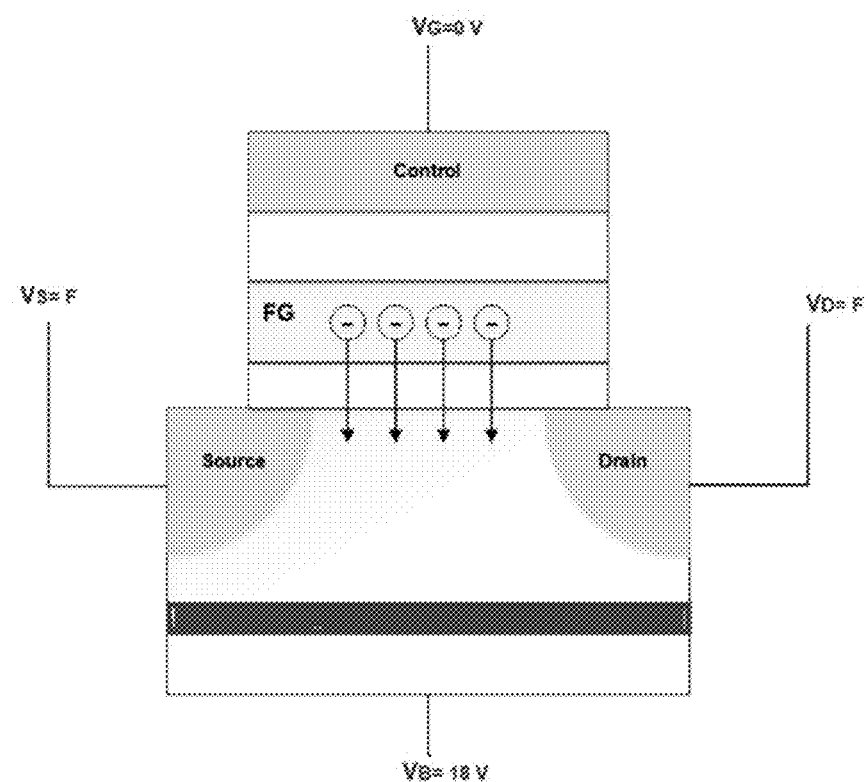
FIG. 19 shows a diagram of a floating gate MOSFET featuring a deep ion implanted layer of degenerated states.
Figure 20:
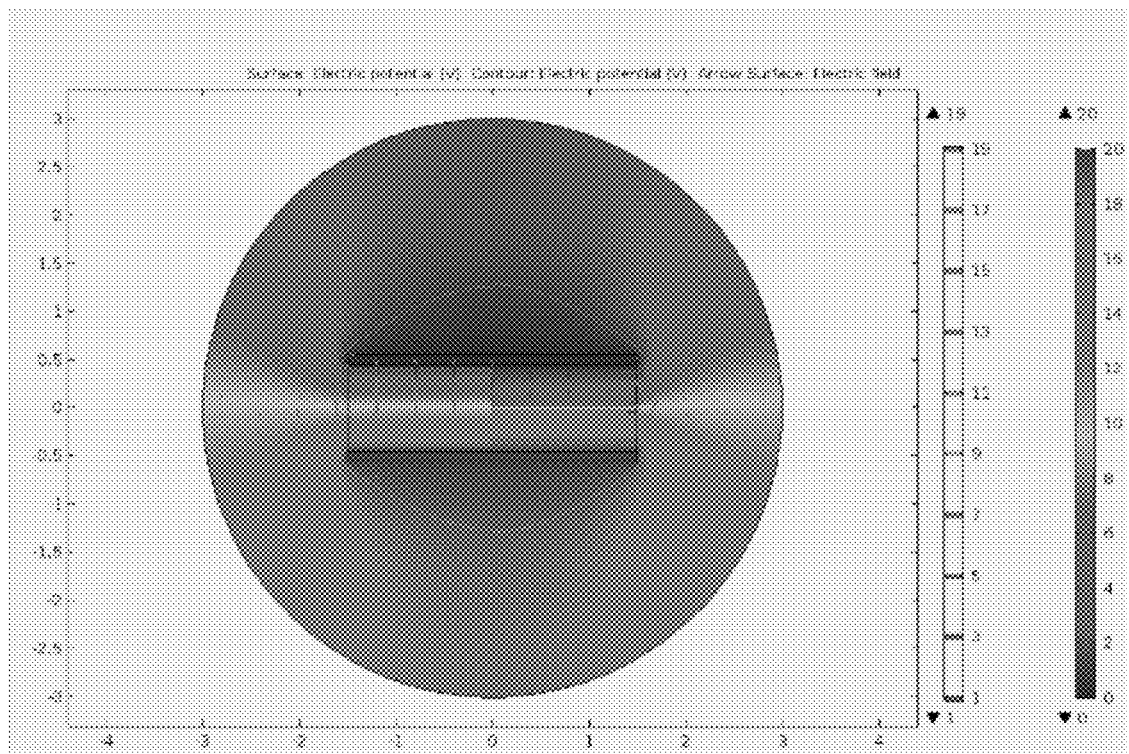
FIG. 20 shows the COMSOL Simulation results of a comparison of electric field distribution. The left side is simulating a floating gate MOSFET without the deep ion implanted layer. The right side is simulating a floating gate MOSFET with the deep ion implanted layer.

In an additional embodiment, a deep ion implanted layer is added to the FG transistor below the surface, preferably approximately 30 nm below. By adding this layer as shown in FIG. 19, the electric field from the gate area in the semiconductor is weakened. This addition prevents reading of the on/off states of the transistors by advanced reverse engineering methods, such as Scanning Kelvin Probe Microscopy or Scanning Capacitance Microscopy.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

Moreover, the terms "substantially" or "approximately" as used herein may be applied to modify any quantitative representation that could permissibly vary without resulting in a change to the basic function to which it is related.

The invention claimed is:

1. A method for obfuscating an integrated circuit,
   wherein the integrated circuit is comprised of at least two layers; and
   wherein two layers located next to each other are neighboring layers;
   comprising:
   a. identifying one or more interconnects of the integrated circuit to be protected;
   b. identifying one or more portions of said interconnects of the integrated circuit to be obfuscated;
   c. adding a security layer between two neighboring layers of the integrated circuit that were selected to be obfuscated;
   d. connecting the layers of the integrated circuit;
   e. configuring the integrated circuit, comprising programming obfuscations into the security layer; and
   f. removing an obfuscation path from the security layer.

2. The method of claim 1, further comprising adding one or more crossbar switches to the security layer and bonding the security layer to the neighboring layers.

3. The method of claim 2, further comprising configuring the integrated circuit, further comprising removing one or more electrons from the security layer.

4. The method of claim 3, wherein the one or more interconnects to be protected are interconnects with low controllability.

5. The method of claim 3, wherein the one or more interconnects to be protected are interconnects with low transition interconnects.

6. The method of claim 3, wherein the security layer comprises a programmable logic array.

7. The method of claim 3, wherein the security layer comprises skein wires.

8. The method of claim 3, wherein the security layer comprises an array of floating gate cells.

9. The method of claim 3, wherein the security layer comprises memory.

10. The method of claim 3, wherein the security layer comprises memory; and wherein the memory stores the configuration of the integrated circuit.

11. The method of claim 3, wherein the security layer comprises memory; and wherein the memory stores the configuration of the crossbar switches.

12. The method of claim 3, wherein hot electron injection is used to program the obfuscations.

13. The method of claim 3, wherein the security layer comprises memory, and wherein hot electron injection is used to program the memory.

14. The method of claim 3, wherein the security layer comprises an array of floating gate cells; and wherein electrons are removed from the floating gate cells.

15. The method of claim 3, wherein the security layer comprises memory; and wherein electrons are removed from the memory.

16. The method of claim 3, wherein the security layer comprises an array of floating gate cells, further comprising adding a layer of degenerate states to each floating gate cell.

* * * * *